United States Patent
Matsuo et al.

(10) Patent No.: US 12,510,007 B2
(45) Date of Patent: Dec. 30, 2025

(54) BALANCER DEVICE FOR INTERNAL COMBUSTION ENGINE AND BALANCER DEVICE WITH OIL PUMP

(71) Applicant: Hitachi Astemo, Ltd., Hitachinaka (JP)

(72) Inventors: Masatoshi Matsuo, Hitachinaka (JP); Masafumi Kurita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 120 days.

(21) Appl. No.: 18/689,786

(22) PCT Filed: Jul. 5, 2022

(86) PCT No.: PCT/JP2022/026670
§ 371 (c)(1),
(2) Date: Sep. 30, 2024

(87) PCT Pub. No.: WO2023/037739
PCT Pub. Date: Mar. 16, 2023

(65) Prior Publication Data
US 2025/0035017 A1   Jan. 30, 2025

(30) Foreign Application Priority Data
Sep. 10, 2021 (JP) ................................. 2021-148003

(51) Int. Cl.
*F01M 1/06* (2006.01)
*F01M 1/02* (2006.01)
(52) U.S. Cl.
CPC ....... *F01M 1/06* (2013.01); *F01M 2001/0276* (2013.01); *F01M 2001/068* (2013.01)
(58) Field of Classification Search
CPC .... F01M 1/06; F01M 1/02; F01M 2001/0276; F01M 2001/068; F02F 1/00; F02F 7/00;
(Continued)

(56) References Cited

U.S. PATENT DOCUMENTS 6,371,071 B1 * 4/2002 Iwata ................. F01M 11/0004
123/196 R
2003/0110940 A1 * 6/2003 Endo ........................ F01M 1/02
92/140

(Continued)

FOREIGN PATENT DOCUMENTS

JP   H-02-212642 A   8/1990
JP   2008-111452 A   5/2008
(Continued)

OTHER PUBLICATIONS

International Search Report dated Sep. 27, 2022 issued in International Application No. PCT/JP2022/026670, with English translation, 7 pages.

(Continued)

*Primary Examiner* — Grant Moubry
(74) *Attorney, Agent, or Firm* — FOLEY & LARDNER LLP

(57) ABSTRACT

Provided is a balancer device for an internal combustion engine, which includes: an upper-side housing to be mounted to an internal combustion engine; a lower-side housing fixed to the upper-side housing; a balancer main body accommodated in a space defined by the upper-side housing and the lower-side housing; and an oil pump fixed at least to the upper-side housing. An end surface portion of the upper-side housing and an end surface portion of the oil pump are mounted in contact with each other, and an end surface portion of the lower-side housing and the end surface portion of the oil pump are mounted to each other so as to define a predetermined gap.

19 Claims, 7 Drawing Sheets

(58) Field of Classification Search
CPC ........ F16F 15/26; F16F 15/264; F16F 15/265; F16F 15/267
See application file for complete search history.

(56) References Cited

U.S. PATENT DOCUMENTS

| | | | |
|---|---|---|---|
| 2013/0146015 A1* | 6/2013 | Akaishi | F16F 15/265 123/192.2 |
| 2015/0292595 A1* | 10/2015 | Sakata | F02B 75/06 123/192.2 |
| 2018/0030888 A1* | 2/2018 | Tamashiro | F01M 1/02 |
| 2019/0345852 A1 | 11/2019 | Kato et al. | |
| 2020/0332856 A1 | 10/2020 | Kurita | |

FOREIGN PATENT DOCUMENTS

| | | |
|---|---|---|
| JP | 2010-060075 A | 3/2010 |
| JP | 2010-230129 A | 10/2010 |
| WO | WO-2007/096270 A1 | 8/2007 |
| WO | WO-2017/141917 A1 | 8/2017 |
| WO | WO-2018/123682 A1 | 7/2018 |

OTHER PUBLICATIONS

Written Opinion dated Sep. 27, 2022 issued in International Application No. PCT/JP2022/026670, with English translation, 14 pages.

\* cited by examiner

BALANCER DEVICE FOR INTERNAL COMBUSTION ENGINE AND BALANCER DEVICE WITH OIL PUMP

TECHNICAL FIELD

The present invention relates to a balancer device for an internal combustion engine, and in particular, to a balancer device for an internal combustion engine, which includes an oil pump, and a balancer device with an oil pump.

BACKGROUND ART

A balancer device is provided to a general internal combustion engine. In the balancer device, a first balancer shaft and a second balancer shaft are rotatably accommodated. The first balancer shaft is driven by a crankshaft. The second balancer shaft is driven by the first balancer shaft. Vibration occurring in the internal combustion engine is reduced by the balancer device.

Balance weights are provided to the first balancer shaft and the second balancer shaft, respectively. The first balancer shaft and the second balancer shaft are rotated at twice an rpm of the crankshaft. Vibration of the internal combustion engine is reduced by bringing an inertial force generated on the crankshaft and an inertial force generated on the first balancer shaft and the second balancer shaft into equilibrium.

Further, as described in Japanese Patent Application Laid-open No. 2010-230129 (Patent Literature 1), the following is known for the balancer device. Specifically, the balancer device is fastened to a lower part of an internal combustion engine main body and is arranged inside an oil pan. The first balancer shaft of the two balancer shafts is rotationally driven by the crankshaft. The second balancer shaft is driven by the first balancer shaft through intermediation of gear transmission means for synchronization, and an oil pump is driven by the second balancer shaft.

In the balancer device, the first balancer shaft and the second balancer shaft, which are arranged in parallel to each other, and a gear transmission mechanism are provided. In the gear transmission mechanism, a first gear and a second gear are provided to one end of the first balancer shaft and one end of the second balancer shaft, respectively, and are meshed with each other. In this case, the first gear and the second gear have the same number of teeth. The first balancer shaft and the second balancer shaft are rotated in synchronization at the same rpm.

A balancer drive gear is provided at another end of the first balancer shaft. Further, a speed-reduction gear for driving the oil pump is provided at another end of the second balancer shaft. The speed-reduction gear is meshed with a pump drive gear fixed to a rotary shaft of the oil pump. An engine-side gear rotated by the internal combustion engine and the balancer drive gear provided to the first balance shaft are meshed with each other. Thus, when the engine-side gear is rotated by the internal combustion engine, the rotation is transmitted from the balancer drive gear to the first balancer shaft, the first gear, the second gear, the second balancer shaft, the speed-reduction gear, and the pump drive gear in the stated order. Finally, the oil pump is rotated.

CITATION LIST

Patent Literature

PTL 1: JP 2010-230129 A

SUMMARY OF INVENTION

Technical Problem

The balancer drive gear, the first balancer shaft, the first gear, the second gear, the second balancer shaft, and the speed-reduction gear, which are described above, are placed on a lower-side housing, are covered with an upper-side housing that is to be combined with the lower-side housing, and are accommodated in a space defined by the two housings.

The engine-side gear, which is located above the balancer drive gear, is meshed with the balancer drive gear. Thus, an area of the upper-side housing, in which the balancer drive gear and the pump drive gear arranged in proximity thereto are located, is cut out so that the upper-side housing has an open structure.

The balancer device is arranged inside the oil pan provided in a lower part of the internal combustion engine. Thus, there occurs a phenomenon in which lubricating oil dropping from the internal combustion engine located above the balancer device falls through the cutout open portion of the upper-side housing onto the balancer drive gear and the pump drive gear arranged in proximity thereto.

In this case, fall of the lubricating oil onto the balancer drive gear is inevitable because the balancer drive gear is meshed with the engine-side gear. However, when more lubricating oil than needed falls onto the pump drive gear that rotationally drives the oil pump, there arises a phenomenon in which rotational resistance due to viscosity of the lubricating oil increases at a meshing portion of the pump drive gear with the speed-reduction gear. The lubricating oil has high viscosity particularly at low temperature. Thus, an increase in rotational resistance cannot be ignored in view of, for example, fuel efficiency.

Further, when the lubricating oil is stirred by the pump drive gear, the lubricating oil is scattered from the open portion of the upper-side housing, leading to, for example, an increase in oil consumption amount due to scraping-up of lubricating oil into the engine.

An object of the present invention is to provide a novel balancer device for an internal combustion engine and a balancer device with an oil pump, which reduce lubricating oil falling on a pump drive gear that rotationally drives an oil pump as much as possible so as to enable suppressing an increase in rotational resistance at a meshing portion between a speed-reduction gear and the pump drive gear and an increase in oil consumption amount.

Solution to Problem

According the present invention, there is provided a balancer device for an internal combustion engine, the balancer device including: an upper-side housing to be mounted to an internal combustion engine, and a lower-side housing, which is fixed to a lower side of the upper-side housing; a balancer main body accommodated in a space defined between the upper-side housing and the lower-side housing; and an oil pump fixed at least to the upper-side housing. A pump drive gear and a speed-reduction gear configured to drive the pump drive gear are arranged between the upper-side housing and the oil pump. An end surface portion of the upper-side housing and an end surface portion of the oil pump are mounted in contact with each other so as to cover the pump drive gear and the speed-reduction gear. An end surface portion of the lower-side housing and the end surface portion of the oil pump are mounted to each other so as to define a predetermined gap.

According to one embodiment of the present invention, the lubricating oil falling on the pump drive gear that rotationally drives the oil pump is reduced as much as possible to enable suppressing an increase in rotational resistance at the meshing portion between the speed-reduction gear and the pump drive gear. Further, scattering of the lubricating oil from an open portion of the upper-side housing, which occurs when the lubricating oil is stirred by the pump drive gear, is suppressed so that, for example, an increase in the oil consumption amount due to scraping-up of lubricating oil into an engine can be suppressed.

DESCRIPTION OF EMBODIMENTS

Now, a detailed description is given of an embodiment of the present invention with reference to the drawings, but the present invention is not limited to the following embodiment, and includes various modifications and application examples in the scope thereof within a technical concept of the present invention.

Figure 1:
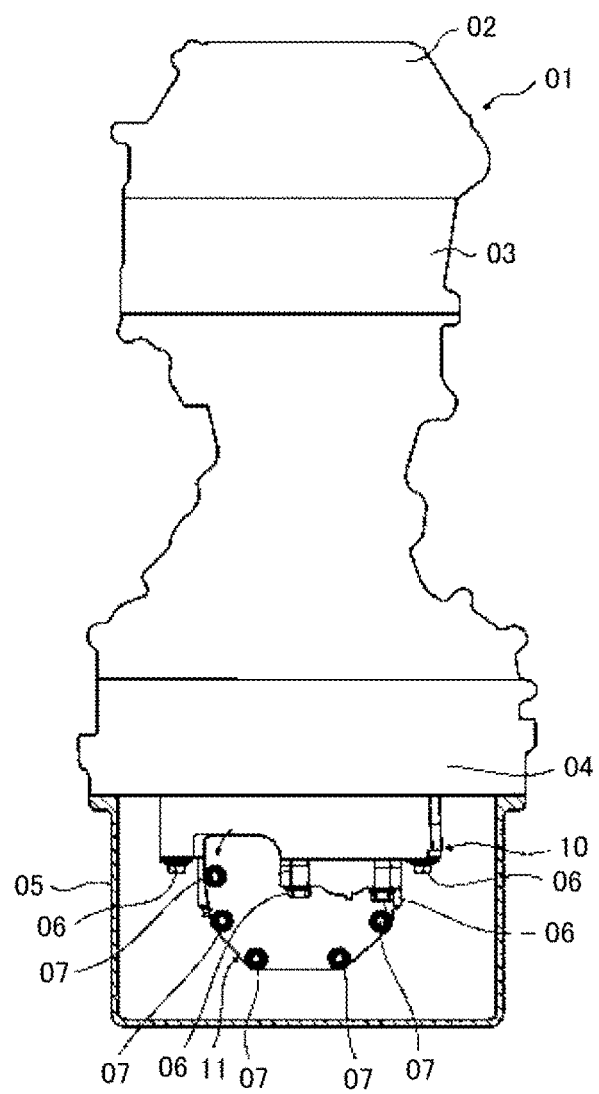
FIG. 1 is a configuration view for illustrating an internal combustion engine to which a balancer device is provided.

Before the embodiment of the present invention is described, installation states of an internal combustion engine and a balancer device are first described briefly with reference to FIG. 1. FIG. 1 merely shows a relationship between the internal combustion engine and the balancer device, and the illustrated balancer device is not a balancer device itself according to this embodiment described below.

In FIG. 1, an internal combustion engine 01 is illustrated. The internal combustion engine 01 is, for example, an inline four-cylinder reciprocating internal combustion engine. A cylinder block 03 is provided below a cylinder head 02. A cylinder block 04 is fixed to a lower surface of the cylinder block 03. A crankshaft (not shown) is rotatably supported in the cylinder block 04. The crankshaft is arranged so that its axial direction extends in a front-and-rear direction of the internal combustion engine.

The internal combustion engine 01 is mounted in a vehicle so that the crankshaft extends laterally with respect to a front-and-rear direction of the vehicle. A crank gear (not shown) is fixed to a part of the crankshaft in the axial direction. The crank gear is an engine-side gear for driving a balancer device 10 described later.

Further, an oil pan 05 in which lubricating oil is stored is mounted to a lower part of the cylinder block 04. The balancer device 10 for suppressing second-order vibration of the internal combustion engine 01 is accommodated in the oil pan 05. The oil pan 05 is provided on a side (ground side) opposite to the internal combustion engine and stores the lubricating oil for lubricating sliding portions of the internal combustion engine.

Although details are described later, the balancer device 10 includes an upper-side housing, a lower-side housing, a balancer main body, and an oil pump 11. The upper-side housing and the lower-side housing are fixed to a lower surface of the cylinder block 04 with a plurality of balancer fixing bolts 06 so as to overlap each other in an up-and-down direction when viewed in a direction of gravity. Further, the oil pump 11 is coupled to and integrated with the balancer device 10 with a plurality of oil pump fixing bolts 07. The oil pump 11 is a variable displacement oil pump in which a change amount in capacity of a pump chamber is varied in accordance with a predetermined operating state.

The variable displacement oil pump used in this embodiment is a vane pump having a mechanism of reducing a change amount in capacity of the pump chamber when the pump rotates at high speed. A publicly known vane pump described in, for example, Japanese Patent Application Laid-open No. 2011-111926 is used. The oil pump 11 is fixed to a front side of the upper-side housing with the plurality of oil pump fixing bolts 07.

As illustrated in FIG. 1, the balancer device 10 is arranged inside the oil pan 05 provided in a lower part of the internal combustion engine. Thus, in a related-art balancer device 10, there occurs a phenomenon in which lubricating oil dropping from the internal combustion engine 01 located above the balancer device 10 falls on a balancer drive gear and a pump drive gear arranged in proximity thereto. When more lubricating oil than needed falls on the pump drive gear that rotationally drives the oil pump, rotational resistance due to viscosity of the lubricating oil increases at a meshing portion of a speed-reduction gear. The lubricating oil has high viscosity particularly at low temperature. Thus, the resistance cannot be ignored in view of, for example, fuel efficiency.

Further, when the lubricating oil is stirred by the pump drive gear, the lubricating oil is scattered from an open portion of the upper-side housing. Hence, for example, an increase in oil consumption amount is caused by scraping-up of lubricating oil into the engine.

Thus, in this embodiment, there is proposed the balancer device that reduces the lubricating oil falling on the pump drive gear that rotationally drives the oil pump 11 as much as possible to thereby enable suppressing an increase in rotational resistance at a meshing portion between the speed-reduction gear and the pump drive gear. Further, the scattering of the lubricating oil from the open portion of the upper-side housing, which occurs when the lubricating oil is stirred by the pump drive gear, is suppressed. Thus, for example, an increase in oil consumption amount due to the scraping-up of lubricating oil into the engine can be suppressed. Now, the balancer device for an internal combustion engine according to this embodiment is described.

Figure 2:
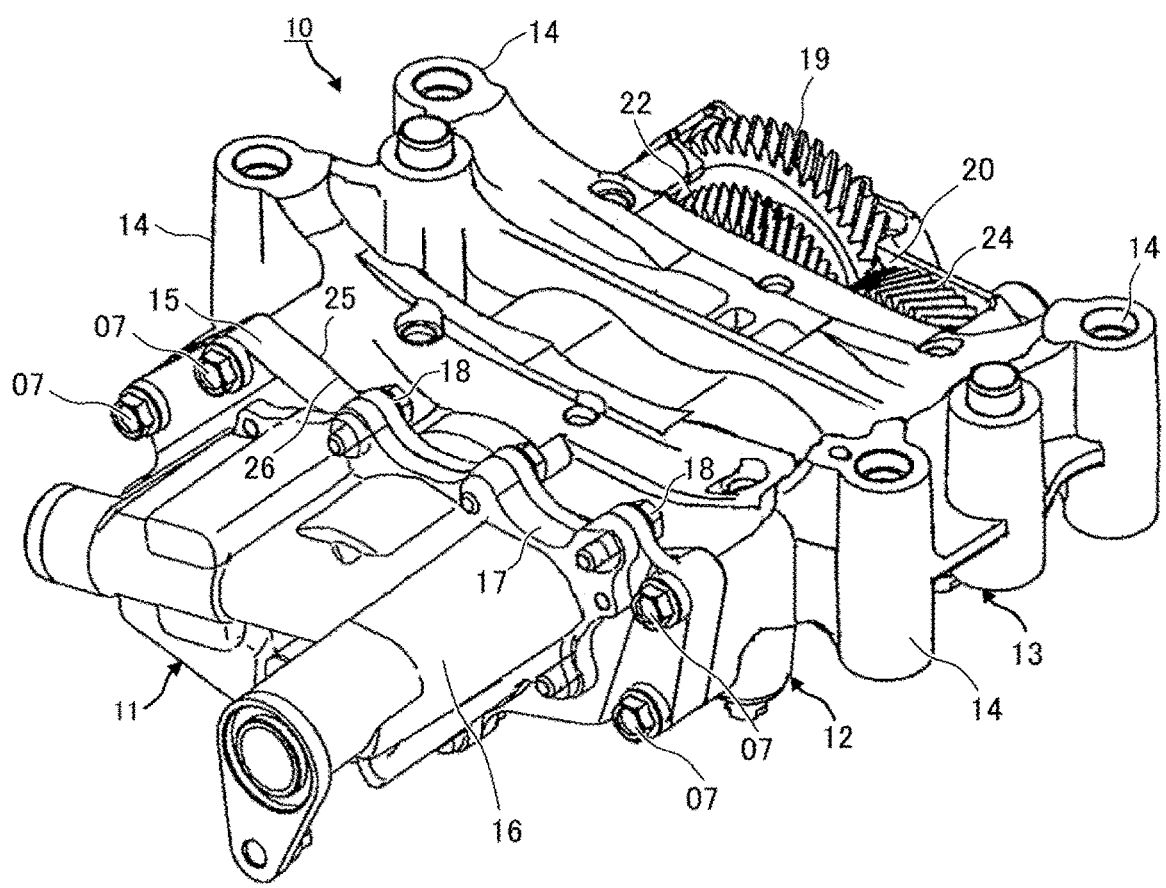
FIG. 2 is an exterior perspective view of the balancer device according to an embodiment of the present invention when viewed from diagonally above.
Figure 3:
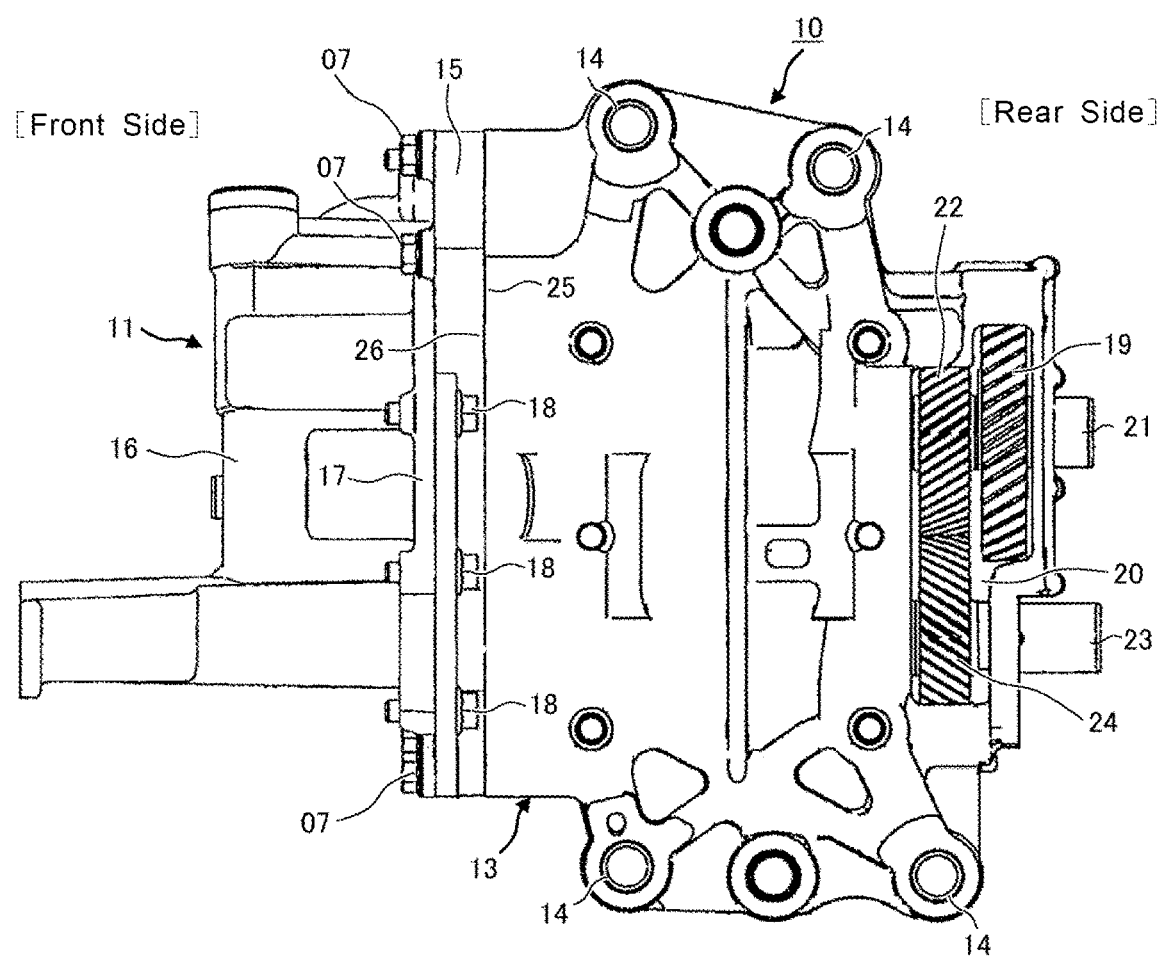
FIG. 3 is a top view of the balancer device illustrated in FIG. 2 when viewed from the internal combustion engine side.
Figure 4:
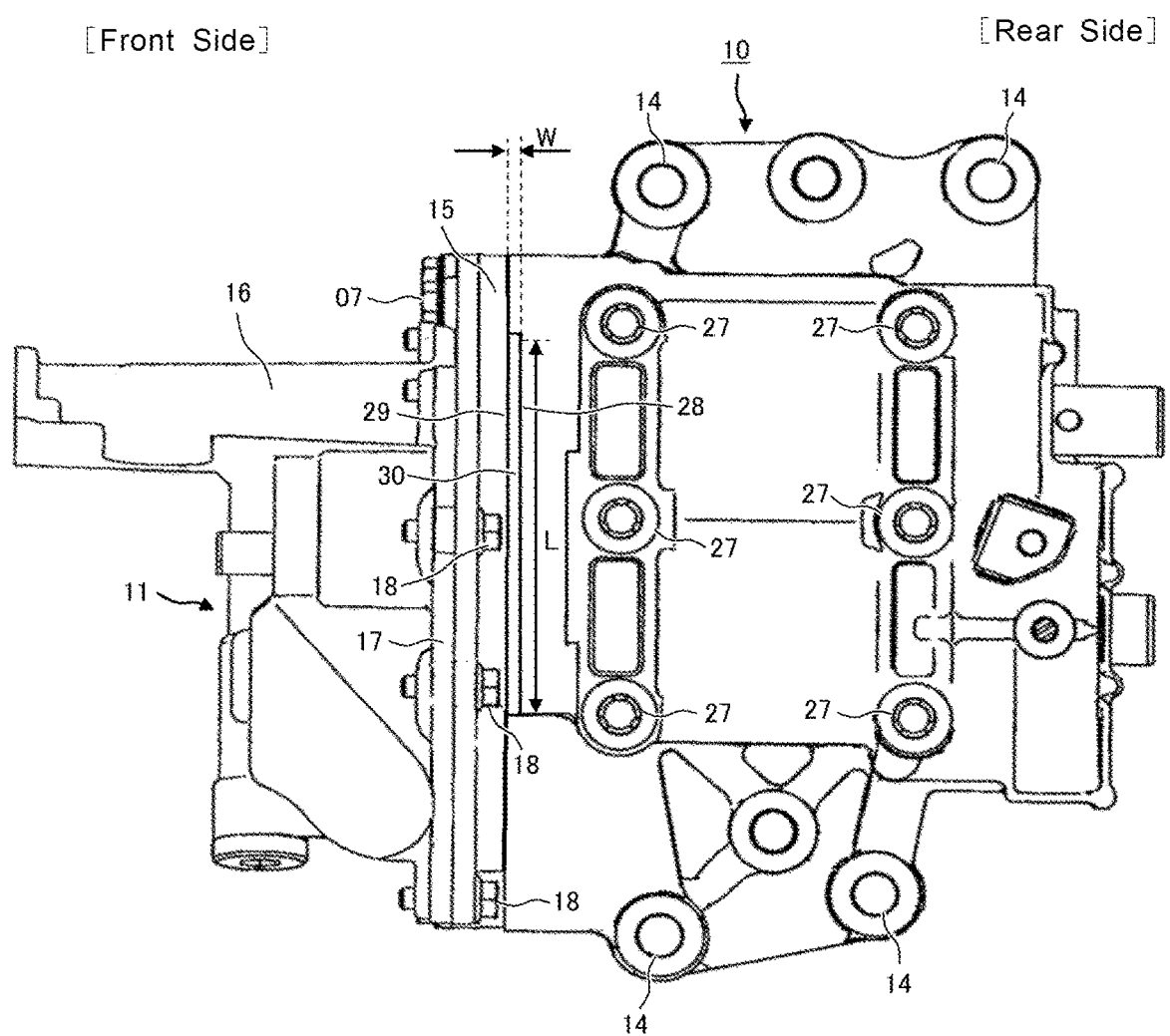
FIG. 4 is a bottom view of the balancer device illustrated in FIG. 2 when viewed from an oil pan side.

A representative embodiment of the present invention is described in detail with reference to FIG. 2 to FIG. 7. First, FIG. 2 is an illustration of an exterior of the balancer device 10 when viewed from diagonally above. A near side in FIG. 2 corresponds to a front side of a vehicle, and a far side in FIG. 2 corresponds to a rear side of the vehicle. FIG. 3 is an illustration of the balancer device 10 when viewed from the internal combustion engine side (upper side), and FIG. 4 is an illustration of the balancer device 10 when viewed from the oil pan side (lower side). The balancer device 10 is fixed to the cylinder block 04 as illustrated in FIG. 1.

In FIG. 2 to FIG. 4, the oil pump 11 is fixed to the front side of the balancer device 10. A pump main body (not shown) is rotationally driven by a second balancer shaft (not shown) built in the balancer device 10. The balancer device 10 includes a lower-side housing 12 and an upper-side housing 13. The lower-side housing 12 is located on a lower side and the upper-side housing 13 is located above the lower-side housing when viewed in the direction of gravity under a state in which the balancer device 10 is mounted to the internal combustion engine.

The balancer main body is accommodated in an accommodation space defined by the two housings 12 and 13. The upper-side housing 13 has fixing portions 14 for fixing the balancer device 10 to the cylinder block 04 with the balancer fixing bolts 06 (see FIG. 1).

The oil pump 11 provided on the front side is fixed to an end surface portion of the upper-side housing 13 through intermediation of a pump flange 15 with the oil pump fixing bolts 07. A surface of the pump flange 15, which is opposite to the balancer device 10, is covered with a pump cover 16 in which the pump main body (not shown) is accommodated. A cover flange 17 of the pump cover 16 is fixed to the pump flange 15 with flange fixing bolts 18. Thus, the pump flange 15 and the pump cover 16 are integrated with each other. The pump flange 15 and the pump cover 16 may also be integrally formed by casting or pressing.

A balancer drive gear 19 is exposed on a side of the balancer device 10, which is opposite to the oil pump 11. The balancer drive gear 19 is meshed with the engine-side gear that is rotated by the crankshaft, to thereby form a rotation transmission system for rotating the balancer main body. The balancer drive gear 19 is accommodated in the lower-side housing 12 and is exposed from an upper opening 20 formed in the upper-side housing 13 to be engaged with the engine-side gear.

Figure 5:
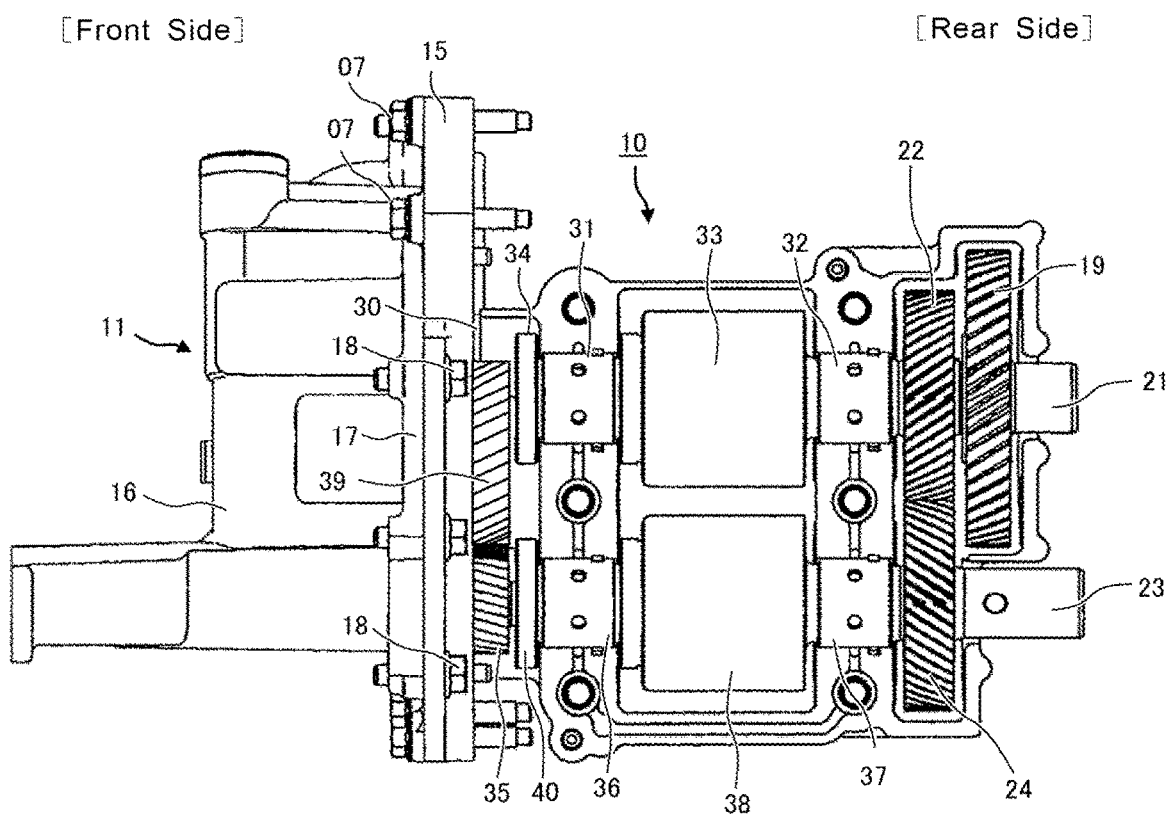
FIG. 5 is a top view of the balancer device illustrated in FIG. 2 with an upper-side housing removed.

A first gear 22 that is fixed to a first balancer shaft 21 (see FIG. 3) is arranged on an inner side of the balancer drive gear 19. A second gear 24 that is fixed to a second balancer shaft 23 (see FIG. 3) is arranged adjacent to the first gear 22, and rotation is transmitted from the first gear 22 to the second gear 24. Well-known balance weights are provided to the first balancer shaft 21 and the second balancer shaft 23, respectively. Configurations of the balance weights are illustrated in FIG. 5.

In a related-art configuration, the balancer drive gear 19 is arranged on the oil pump 11 side. In the configuration of this embodiment, however, the balancer drive gear 19 is arranged on the side opposite to the oil pump 11. Thus, there is no need to form the upper opening 20 for exposing the balancer drive gear 19 in the upper-side housing 13 on the oil pump 11 side. Thus, as described later, an end surface portion 25 of the upper housing 13 on the oil pump 11 side and an end surface portion 26 of the pump flange 15 on the balancer device 10 side can be brought into close contact with each other.

Although details are described later, the pump drive gear (not shown) and the speed-reduction gear (not shown) are accommodated in a gear accommodation space (see FIG. 6) defined by the end surface portion 25 of the upper-side housing 13 on the oil pump 11 side and the end surface portion 26 of the pump flange 15 on the balancer device 10 side. The pump drive gear drives the oil pump 11. The speed-reduction gear is fixed to the second balancer shaft 23 and drives the pump drive gear.

Thus, the end surface portion 25 of the upper-side housing 13 on the oil pump 11 side and the end surface portion 26 of the pump flange 15 on the balancer device 10 side are in close contact with each other. Hence, the end surface portion 25 of the upper-side housing 13 on the oil pump 11 side has a so-called "roof function," and thus, can suppress flow of lubricating oil dropping from the internal combustion engine toward the pump drive gear or the speed-reduction gear.

In FIG. 4, the lower-side housing 12 is fixed to the upper-side housing 13 with housing fixing bolts 27. Further, an oil discharge hole 30 is defined by an end surface portion 28 of the lower-side housing 12 on the oil pump 11 side and an end surface portion 29 of the pump flange 15 on the balancer device 10 side. The oil discharge hole 30 has a rectangular shape with a width (W) and a length (L) and allows the lubricating oil to be discharged therethrough. The end surface portion 26 of the pump flange 15 illustrated in FIG. 3 and the end surface portion 29 of the pump flange 15 illustrated in FIG. 4 are actually the same flat surface region of the pump flange 15, which faces the balancer device 10.

The oil discharge hole 30 is defined by a recessed portion formed by cutting out the end surface portion 28 of the lower-side housing 12 on the oil pump 11 side in a direction opposite to the oil pump 11. When the cutout for defining the oil discharge hole 30 is formed in the lower-side housing 12 in the above-mentioned manner, the oil discharge hole 30 can be formed by simply cutting out the end surface of the lower-side housing 12. Thus, such formation of the oil discharge hole is advantageous in manufacture.

The oil discharge hole 30 functions so as to return the lubricating oil accumulated in the gear accommodation space to the oil pan. The pump drive gear and the speed-reduction gear are accommodated in the gear accommodation space. The gear accommodation space is defined by the end surface portion 25 of the upper-side housing 13 on the oil pump 11 side and the end surface portion 26 of the pump flange 15 on the balancer device 10 side. The gear accommodation space is defined by the end surface portion 28 of the lower-side housing 12 on the oil pump 11 side and the end surface portion 29 of the pump flange 15 on the balancer device 10 side.

Further, in this embodiment, the oil pump 11 is fixed to the upper-side housing 13 through intermediation of the pump flange 15 with the oil pump fixing bolts 07. Meanwhile, the oil pump 11 is not fixed to the lower-side housing 12. If the oil pump 11 is also mounted to the lower-side housing 12, an influence of a mounting error between the upper-side housing 13 and the lower-side housing 12 cannot be eliminated. When the oil pump 11 is fixed only to the upper-side housing 13, however, positional accuracy of, for example, a discharge hole, a tightening screw hole, and a sealing surface of the oil pump 11 at the time of fastening can be improved. When the above-mentioned influence can be eliminated, the oil pump 11 may also be mounted to the lower-side housing 12.

Next, an internal configuration of the balancer device 10 is described with reference to FIG. 5. In FIG. 5, there is illustrated a state in which the upper-side housing 13 illustrated in FIG. 2 is removed.

The balancer main body includes a first rotating system having a balance weight and a second rotating system similarly having a balance weight. The balancer main body is configured to invert rotation of the first rotating system through a gear transmission mechanism to rotate the second rotary system. Then, the first rotating system and the second rotating system are rotated to generate a vibration force. An antiphase vibration force to a phase of a second-order component of a vibration force of the internal combustion engine, which is generated by reciprocating motions of pistons, is generated to thereby reduce vibration of the internal combustion engine. The above-mentioned configurations are well known.

The first rotating system includes the balancer drive gear 19, the first gear 22, a front-side first bearing 31, a rear-side first bearing 32, and a first balance weight 33. The balancer drive gear 19 and the first gear 22 are fixed to the first balancer shaft 21. The front-side first bearing 31 and the rear-side first bearing 32 pivotably support the first balancer shaft 21. The first balance weight 33 is provided to the first balance shaft 21. The front-side first bearing 31 and the rear-side first bearing 32 are fixed and supported between the lower-side housing 12 and the upper-side housing 13 to thereby rotate and support the first balancer shaft 21. A first thrust receiving portion 34 having a circular shape is arranged on the first balancer shaft 21 so as to be located closer to the oil pump 11.

Meanwhile, the second rotating system includes a speed-reduction gear 35, the second gear 24, a front-side second bearing 36, a rear-side second bearing 37, and a second balance weight 38. The speed-reduction gear 35 is fixed to two ends of the second balancer shaft 23. The front-side second bearing 36 and the rear-side second bearing 37 pivotably support the second balancer shaft 23. The second balance weight 38 is provided to the second balancer shaft 23. In this case, the speed-reduction gear 35 is meshed with a pump drive gear 39 that is coupled to a rotary shaft of the oil pump 11 to rotate the pump drive gear 39.

Further, the front-side second bearing 36 and the rear-side second bearing 37 are fixed and supported between the lower-side housing 12 and the upper-side housing 13 to thereby rotate and support the second balancer shaft 23. A second thrust receiving portion 40 having a circular shape is arranged on the second balancer shaft 23 so as to be located closer to the oil pump 11.

When the engine-side gear that is fixed to the crankshaft disposed above the balancer device 10 is rotated, the balancer drive gear 19 is rotated at twice an rpm of the engine-side gear, and the first balancer shaft 21 to which the balancer drive gear 19 is fixed is also rotated. Further, when the second gear 24 that is meshed with the first gear 22 fixed to the first balancer shaft 21 is rotated, the second balancer shaft 23 that has been subjected to phase adjustment with the first balancer shaft 21 is rotated to thereby generate a balancer vibration force. The balancer device 10 generates the antiphase vibration force to the phase of the second-order component of the vibration force of the internal combustion engine, which is generated by reciprocating motions of the pistons, to thereby reduce the vibration of the internal combustion engine.

As described above, the balancer drive gear 19 is fixed to an end portion of the first balancer shaft 21, which is on a side opposite to the oil pump 11. The first gear 22 is fixed to the end portion of the first balancer shaft 21 so as to be located on an inner side of the balancer drive gear 19. The first balancer shaft 21 is pivotably supported by the front-side first bearing 31 and the rear-side first bearing 32. Further, the first balance weight 33 is provided to the first balancer shaft so as to be located between the front-side first bearing 31 and the rear-side first bearing 32.

Similarly, the second gear 24 and the speed-reduction gear 35 are fixed to two ends of the first balancer shaft 23 that is arranged in parallel to the first balancer shaft 21, respectively. The second balancer shaft 23 is pivotably supported by the front-side second bearing 35 and the rear-side second bearing 36. Further, the second balance weight 38 is provided to the second balancer shaft 23 so as to be located between the front-side second bearing 35 and the rear-side second bearing 36. The second gear 24 is rotated by the first gear 22 to thereby rotate the second balancer shaft 23 and further rotate the speed-reduction gear 35.

The pump drive gear 39 that is fixed to the rotary shaft of the oil pump 11 is provided between the front-side first bearing 31 that pivotably supports the first balancer shaft 21 and the oil pump 11. The pump drive gear 39 is meshed with the speed-reduction gear 35. The gear accommodation space in which the pump drive gear 39 and the speed-reduction gear 35 are located is connected to the oil discharge hole 30. Thus, unnecessary lubricating oil in the gear accommodation space is discharged to the oil pan through the oil discharge hole 30.

As illustrated in FIG. 2, the balancer drive gear 19, the first gear 22, and the second gear 24 are accommodated in the lower-side housing 12 and are exposed from the upper opening 20 formed in the upper housing 13. Meanwhile, the speed-reduction gear 35 and the pump drive gear 39 are rotatably accommodated in the gear accommodation space defined between the end surface portions 25 and 28 of the lower-side housing 12 and the upper-side housing 13, which face the pump flange 15, and, in addition, are covered with the end surface portions 25 and 28 of the lower-side housing 12 and the upper-side housing 13.

Thus, the lubricating oil dropping from the internal combustion engine is blocked by, in particular, the end surface portion 25 of the upper-side housing 13. Thus, intrusion of the lubricating oil into the gear accommodation space in which the speed-reduction gear 35 and the pump drive gear 39 are accommodated can be suppressed.

Further, the lubricating oil in the gear accommodation space in which the speed-reduction gear 25 and the pump drive gear 39 are accommodated is discharged from the oil discharge hole 30 defined between the end surface portion 28 of the lower-side housing 12 and the end surface portion 29 of the pump flange 15. Thus, surplus lubricating oil is not stored in the gear accommodation space in which the speed-reduction gear 35 and the pump drive gear 39 are accommodated.

Thus, there does not occur a phenomenon in which the lubricating oil dropping from the internal combustion engine 01 located above the balancer device 10 falls onto the balancer drive gear and the pump drive gear arranged in proximity thereto. Hence, a problem of an increase in rotational resistance due to viscosity of the lubricating oil can be solved. Further, the upper-side housing 13 does not have an open portion. Thus, there does not occur a phenomenon in which the lubricating oil is scattered when the lubricating oil is stirred by the pump drive gear. Thus, a problem in which, for example, an increase in oil consumption amount is brought about can be solved.

Next, a configuration of the gear accommodation space defined by the end surface portion 25 of the upper-side housing 13 on the oil pump 11 side and the end surface portion 26 of the pump flange 15 on the balancer device 10 side and the gear accommodation space defined by the end surface portion 28 of the lower-side housing 12 on the oil pump 11 side and the end surface portion 29 of the pump flange 15 on the balancer device 10 side is described.

Figure 6:
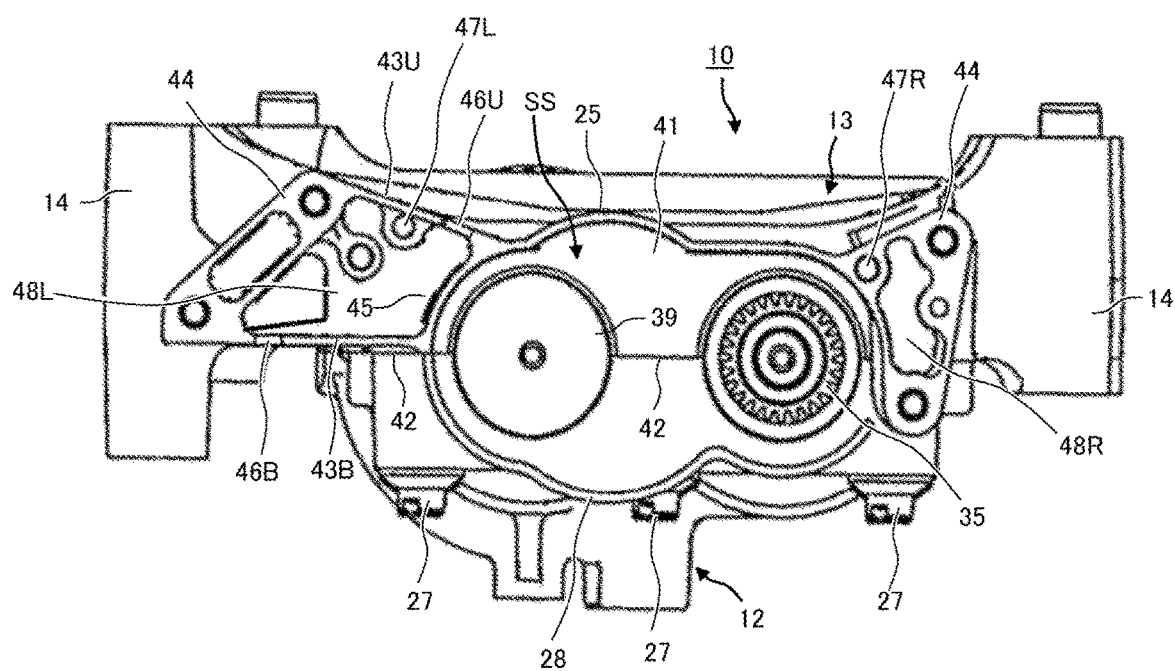
FIG. 6 is a side view of the balancer device when the A-A plane of the balancer device illustrated in FIG. 3 is viewed from the oil pump side.

In FIG. 6, there is illustrated a side view when viewed from the oil pump side in an axial direction of the balance shaft 21, 23 under a state in which the pump flange 15 to which the oil pump 11 is fixed is removed from the upper-side housing 13. Similarly, in FIG. 7, there is illustrated an exterior view when viewed from diagonally above under the above-mentioned state.

Figure 7:
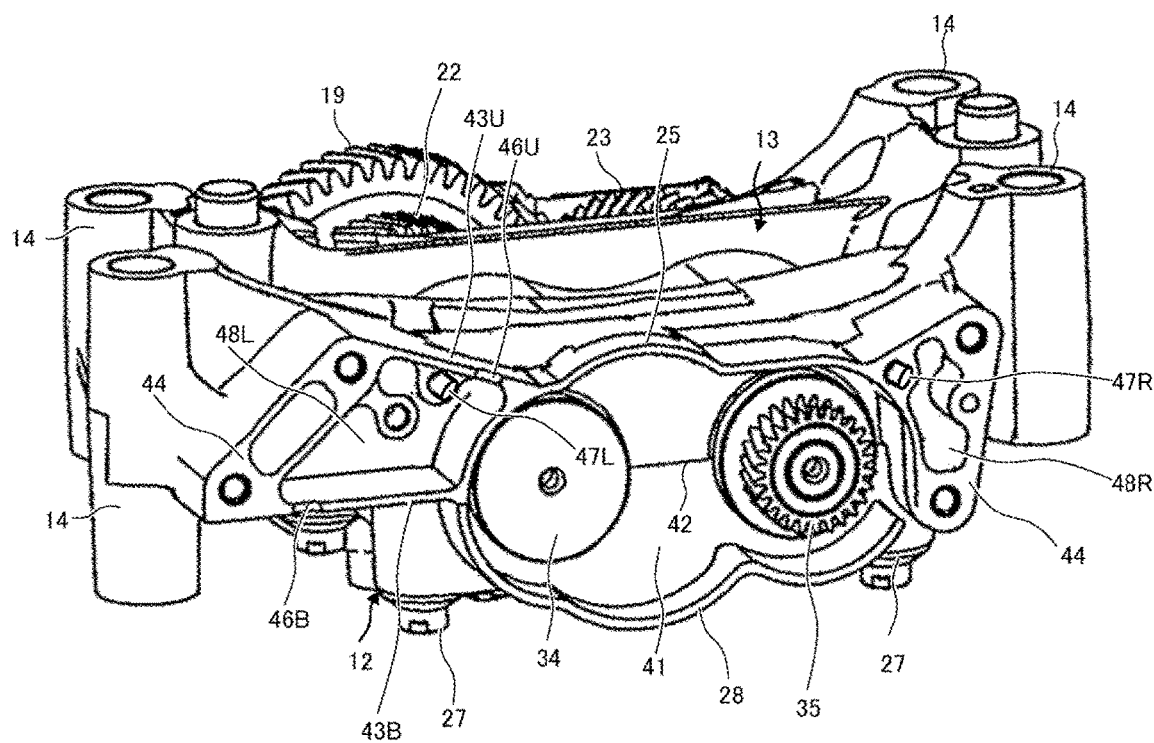
FIG. 7 is an exterior perspective view of the balancer device illustrated in FIG. 6 when viewed from diagonally above.

In FIG. 6 and FIG. 7, the end surface portion 25 of the upper-side housing 13 is formed on a side surface (SS; a surface onto which the pump flange 15 is mounted) of the upper-side housing 13, which is orthogonal to the axial direction of the balance shaft 21, 23. This end surface portion 25 defines a gear accommodation space 41 in which the pump drive gear 39 and the speed-reduction gear 35 are accommodated. The end surface portion 25 is formed so as to cover the pump drive gear 39 and the speed-reduction gear 35 on their upper side and, in addition, extends to a vicinity of a coupling surface 42 between the upper-side housing 13 and the lower-side housing 12.

A length of the end surface portion 25 in the axial direction of the balancer shaft 21, 23 is determined to be larger than thicknesses of the pump drive gear 39 and the speed-reduction gear 35 in the axial direction so as to accommodate the pump drive gear 39 and the speed-reduction gear 35 and is set to a length that allows contact with a flat surface region of the end surface portion 26 of the pump flange 15, which is mounted to pump fixing portions described later. Thus, the end surface portions 25 and 26 are in contact with each other in such a manner that the lubricating oil is less liable to intrude into a contact portion therebetween.

Hereinafter, the end surface portion 25 is referred to as "upper-side protruding partition wall portion 25." Further, the upper-side protruding partition wall portion 25 is formed in a plate-like shape protruding toward the oil pump 11 in the axial direction of the balancer shaft 21, 23.

A peripheral shape of the upper-side protruding partition wall portion 25 is set to conform with shapes of the pump drive gear 39 and the speed-reduction gear 35 that are accommodated inside. Further, a pair of an upper reinforcing protruding partition wall portion 43U and a lower reinforcing protruding partition wall portion 43B is formed in upper-side protruding partition wall portion 25 so as to extend from the upper-side protruding partition wall portion 25 in a direction away from the gear accommodation space 41. The reinforcing protruding partition wall portions 43U and 43B extend to a pump fixing portion 44 and have a reinforcing function for preventing deformation of the upper-side protruding partition wall portion 25. The pump fixing portions 44 are fixing surfaces on which the pump flange 15 is fixed.

Further, an oil outflow passage 45 is formed in a spatial area surrounded by the reinforcing protruding partition wall portions 43U and 43B and the upper-side protruding partition wall portion 25. The oil outflow passage 45 is formed by using a space that exists between the upper-side protruding partition wall portion 25 and the pump fixing portion 44.

Further, an upper oil outflow hole 46U and a lower oil outflow hole 46B are formed in the reinforcing protruding partition wall portions 43U and 43B, respectively. The lower oil outflow hole 46B is formed at a position far from the upper oil outflow hole 46U on an outer side of the upper oil outflow hole 46U when viewed from the first balancer shaft 21. Further, when the balancer device 10 is actually mounted to the internal combustion engine, the balancer device 10 is mounted so that the lower oil outflow hole 46B is located on a lower side in the direction of gravity. Thus, the lubricating oil can flow smoothly.

The lubricating oil dropping from the internal combustion engine flows on an outer side of the upper-side protruding partition wall portion 25, flows through the upper oil outflow hole 46U into the oil outflow passage 45, passes through the oil outflow passage 45 to flow out from the lower oil outflow hole 46B, and is returned to the oil pan. As described above, the lubricating oil is smoothly returned to the oil pan. Thus, a lack of oil for lubricating oil to be circulated can be suppressed.

The pump flange 15 is mounted to the pump fixing portions 44, and the oil pump 11 is fixed thereto with the pump fixing bolts 07. A wall thickness of the upper-side protruding partition wall portion 25 is set smaller than a wall thickness of the pump fixing portions 44. Thus, the upper-side protruding partition wall portion 25 is reduced in weight, and strength of the pump fixing portions 44 is increased. When the upper-side protruding wall partition wall portion 25 is thinned, strength is reduced. Thus, strength is reinforced by the reinforcing protruding partition wall portions 43U and 43B.

Meanwhile, the end surface portion 28 of the lower-side housing 12 is formed on the side surface (SS) of the lower-side housing 12, which is orthogonal to the axial direction of the balance shaft 21, 23. The end surface portion 28 defines the gear accommodation space 41 in which the pump drive gear 39 and the speed-reduction gear 35 are accommodated. The end surface portion 28 covers the pump drive gear 39 and the speed-reduction gear 35 on their lower side and is formed so as to extend to the vicinity of the coupling surface 42 between the upper-side housing 13 and the lower-side housing 12.

A length of the end surface portion 28 in the axial direction of the balance shaft 21, 23 is set to a length that allows accommodation of the pump drive gear 39 and the speed-reduction gear 35. However, the length of the end surface portion 28 is shorter than the length of the end surface portion 25 of the upper-side housing 13 because the oil discharge hole 30 is formed as described above. Hereinafter, the end surface portion 28 is referred to as "lower-side protruding partition wall portion 28." Further, the lower-side protruding partition wall portion 28 is formed in a plate-like shape protruding toward the oil pump 11 in the axial direction of the balancer shaft 21, 23.

A peripheral shape of the lower-side protruding partition wall portion 28 is set to conform with the shapes of the pump drive gear 39 and the speed-reduction gear 35 that are accommodated inside. Further, the oil discharge hole 30 is formed on a lower side in the direction of gravity between the lower-side protruding partition wall portion 28 and the end surface portion 29 of the pump flange 15 so as to allow the lubricating oil to be discharged. The lubricating oil in the gear accommodation space 41 flows out from the oil discharge hole 30 and is returned to the oil pan. As described above, the lubricating oil is smoothly returned to the oil pan. Thus, a lack of oil for lubricating oil to be circulated can be suppressed.

Further, as illustrated in FIG. 5 and FIG. 6, the speed-reduction gear 35 is formed with a diameter smaller than a diameter of the second thrust receiving portion 40 having a circular shape provided between the second balance weight 38 and the speed-reduction gear 35. Further, the pump drive gear 39 is formed with a diameter larger than a diameter of the first thrust receiving portion 34 having a circular shape provided between the first balance weight 33 and the pump drive gear 39. The use of the configuration described above has effects in that the pump drive gear 39 and the speed-reduction gear 35 can be lubricated with a small amount of lubricating oil from the thrust receiving portion 34 provided on the first balance shaft 21 and thus the lubricating oil does not unnecessarily fall on the speed-reduction gear 35.

Further, as illustrated in FIG. 6 and FIG. 7, a pair of positioning pins 47L and 47R is provided on a mounting surface to which the oil pump 11 is to be mounted, which is the side surface SS of the upper-side housing 13, so that the first balancer shaft 21 and the second balancer shaft 23 are located therebetween. The positioning pins 47L and 47R enable positioning of the pump flange 15. Consequently, mounting accuracy for the oil pump 11 can be improved.

Further, a space 48L having a predetermined shape for forming the oil outflow passage 45 is defined between the pump fixing portion 44 on the left side in FIG. 6 and FIG. 7 and the gear accommodation space 41. The space 48L has effects in that the upper-side housing 13 can be reduced in weight, the oil outflow passage 45 can be shared, and propagation of vibration caused by an operation of the oil pump 11 can be suppressed. Further, the pump fixing portion 44 on the right side in FIG. 6 and FIG. 7 has a space 48R having a predetermined shape. The space 48R has effects in that the upper-side housing 13 can be reduced in weight and the propagation of vibration caused by the operation of the oil pump 11 can be suppressed.

Referring to FIG. 5 again, each of the speed-reduction gear 35 and the pump drive gear 39 is formed of a helical gear. It is preferred that twist angles of those helical gears be set to an angle that enhances an effect of moving the lubricating oil toward the oil discharge hole 30 through rotation of the speed-reduction gear 35 and the pump drive gear 39. Setting the twist angle as described above enables smooth discharge of the lubricating oil to the oil pan.

Further, it is preferred that the twist angles of the helical gears being the speed-reduction gear 35 and the pump drive gear 39 be set to an angle that enables generation of a thrust force for shifting the pump drive gear 39 toward the oil pump 11. Setting the twist angle as described above can have effects in that a gap from the first thrust receiving portion 34 is increased and flow of the lubricating oil in the gear accommodation space 41 is smoothened to facilitate the discharge of the lubricating oil.

In the embodiment described above, a dual-axis balancer device including the first balancer shaft and the second balancer shaft is disclosed as the balancer device. However, the present invention is also applicable to a uniaxial balancer device using only the first balancer shaft.

As described above, the balancer device according to the present invention includes the upper-side housing to be mounted to the internal combustion engine, the lower-side housing fixed to the lower side of the upper-side housing, the balancer main body accommodated in the space defined between the upper-side housing and the lower-side housing, and the oil pump fixed at least to the upper-side housing. The end surface portion of the upper-side housing and the end surface portion of the oil pump are mounted in contact with each other, and the end surface portion of the lower-side housing and the end surface portion of the oil pump are mounted to each other so as to define a predetermined gap.

With the configuration described above, the lubricating oil falling on the pump drive gear that rotationally drives the oil pump can be reduced as much as possible to enable suppressing an increase in rotational resistance at the meshing portion between the speed-reduction gear and the pump drive gear. Further, the scattering of the lubricating oil from the open portion of the upper-side housing, which may occur when the lubricating oil is stirred by the pump drive gear, is suppressed, and thus, for example, an increase in consumption amount of the lubricating oil, which may be caused by the scraping-up of lubricating oil into the engine, can be suppressed.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-148003 filed on Sep. 10, 2021. All disclosed contents including Specification, Scope of Claims, Drawings, and Abstract of Japanese Patent Application No. 2021-148003 filed on Sep. 10, 2021 are incorporated herein by reference in their entirety.

REFERENCE SIGNS LIST

07 . . . oil pump fixing bolt, 10 . . . balancer device, 11 . . . oil pump, 12 . . . lower-side housing, 13 . . . upper-side housing, 15 . . . pump flange, 19 . . . balancer drive gear, 21 . . . first balancer shaft, 22 . . . first gear, 23 . . . second balancer shaft, 24 . . . second gear, 33 . . . first balance weight, 30 . . . oil discharge hole, 31 . . . front-side first bearing, 32 . . . rear-side first bearing, 34 . . . speed-reduction gear, 35 . . . front-side second bearing, 36 . . . rear-side second bearing, 37 . . . second balance weight, 38 . . . pump drive gear

The invention claimed is:

1. A balancer device for an internal combustion engine, the balancer device comprising:
   an upper-side housing to be mounted to an internal combustion engine, and a lower-side housing, which is provided below the upper-side housing when viewed in a direction of gravity and is fixed to the upper-side housing;
   a balancer main body accommodated in a space defined between the upper-side housing and the lower-side housing; and
   an oil pump fixed at least to the upper-side housing;
   wherein a pump drive gear and a speed-reduction gear configured to drive the pump drive gear are arranged between the upper-side housing and the oil pump,
   wherein an end surface portion of the upper-side housing and an end surface portion of the oil pump are mounted in contact with each other so as to cover the pump drive gear and the speed-reduction gear, and
   wherein an end surface portion of the lower-side housing and the end surface portion of the oil pump are mounted to each other so as to define a predetermined gap.

2. A balancer device for an internal combustion engine, the balancer device comprising:
   a first balancer shaft having one end to which a balancer drive gear to be meshed with an engine-side gear rotated by an internal combustion engine and a first gear are fixed, the first balancer shaft having a first balance weight provided adjacent to the first gear;
   a second balancer shaft having one end to which a second gear to be meshed with the first gear is fixed and another end to which a speed-reduction gear to be meshed with a pump drive gear of an oil pump is fixed, the second balancer shaft having a second balance weight provided between the second gear and the speed-reduction gear;

a lower-side housing on which the first balancer shaft including the balancer drive gear, the first gear, and the first balance weight and the second balancer shaft including the second gear, the second balance weight, and the speed-reduction gear are placed; and an upper-side housing arranged above the lower-side housing when viewed in a direction of gravity, the upper-side housing being formed in such a shape as to cover the first balancer shaft including the first balance weight, the second balancer shaft including the second balance weight, the speed-reduction gear, and the pump drive gear on their upper side, the upper-side housing being mounted to the lower-side housing, wherein, under a state in which the speed-reduction gear is meshed with the pump drive gear with the oil pump being mounted thereto, an end surface portion of the upper-side housing and an end surface portion of the oil pump are mounted in contact with each other so as to cover the pump drive gear and the speed-reduction gear on their upper side, and an end surface portion of the lower-side housing and the end surface portion of the oil pump are mounted to each other so as to define a predetermined gap for discharging lubricating oil from a space in which the pump drive gear and the speed-reduction gear are arranged.

3. The balancer device for an internal combustion engine according to claim 2, wherein the balancer drive gear fixed to the first balancer shaft is meshed with the engine-side gear rotated by a crankshaft of the internal combustion engine and is rotationally driven.

4. The balancer device for an internal combustion engine according to claim 3, wherein the oil pump is fixed only through a pump fixing portion formed on the end surface portion of the upper-side housing.

5. The balancer device for an internal combustion engine according to claim 4, wherein a gear accommodation space for accommodating the speed-reduction gear and the pump drive gear is defined by the end surface portion of the upper-side housing and the end surface portion of the lower-side housing.

6. The balancer device for an internal combustion engine according to claim 5, wherein the gear accommodation space is defined by an upper-side protruding partition wall portion formed on the end surface portion of the upper-side housing and a lower-side protruding partition wall portion formed on the end surface portion of the lower-side housing, the protruding partition wall portions each having a plate-like shape.

7. The balancer device for an internal combustion engine according to claim 6, wherein a thickness of the upper-side protruding partition wall portion is set smaller than a thickness of the pump fixing portion.

8. The balancer device for an internal combustion engine according to claim 6, wherein the gear accommodation space is defined by the upper-side protruding partition wall portion and the end surface portion of the oil pump, which is arranged so as to face the lower-side protruding partition wall portion.

9. The balancer device for an internal combustion engine according to claim 6, wherein a space having a predetermined shape is formed between the pump fixing portion formed on the end surface portion of the upper-side housing and the upper-side protruding partition wall portion.

10. The balancer device for an internal combustion engine according to claim 8, wherein the upper-side protruding partition wall portion and the lower-side protruding partition wall portion extend to a vicinity of a coupling surface between the upper-side housing and the lower-side housing, and a peripheral shape of each of the upper-side protruding partition wall portion and the lower-side protruding partition wall portion is formed so as to conform with shapes of the speed-reduction gear and the pump drive gear.

11. The balancer device for an internal combustion engine according to claim 10, wherein an oil outflow passage is formed along an outer peripheral shape of the upper-side protruding partition wall portion.

12. The balancer device for an internal combustion engine according to claim 11, wherein an upper reinforcing protruding partition wall portion connected to an upper part of the upper-side protruding partition wall portion and a lower reinforcing protruding partition wall portion connected to a lower part of the upper-side protruding partition wall portion are formed between the upper-side protruding partition wall portion and the pump fixing portion, and wherein the upper reinforcing protruding partition wall portion has an upper oil outflow hole that connects an outer side of the upper-side protruding partition wall portion and the oil outflow passage, and the lower reinforcing protruding partition wall portion has a lower oil outflow hole that connects an outer side of the lower-side protruding partition wall portion and the oil outflow passage.

13. The balancer device for an internal combustion engine according to claim 12, wherein the lower oil outflow hole is formed at a position farther than the upper oil outflow hole from the first balancer shaft.

14. The balancer device for an internal combustion engine according to claim 2, wherein the pump drive gear and the speed-reduction gear are helical gears, and a twist angle of each of the helical gears is set to an angle that enables enhancement of an effect of moving lubricating oil toward the gap when the pump drive gear and the speed-reduction gear are rotated.

15. The balancer device for an internal combustion engine according to claim 2, wherein the pump drive gear and the speed-reduction gear are helical gears, and a twist angle of the pump drive gear is set so that the pump drive gear generates a thrust force toward the oil pump.

16. The balancer device for an internal combustion engine according to claim 2, wherein the gap is formed of a cutout formed in the upper-side housing in a direction away from the end surface portion of the oil pump.

17. The balancer device for an internal combustion engine according to claim 2, wherein the speed-reduction gear is formed with a diameter smaller than a diameter of a second thrust receiving portion provided between the second balance weight and the speed-reduction gear, and wherein the pump drive gear is formed with a diameter larger than a diameter of a first thrust receiving portion provided between the first balance weight and the pump drive gear.

18. The balancer device for an internal combustion engine according to claim 2, wherein a pair of positioning pins configured to position the end surface portion of the oil pump is provided on a mounting surface of the upper-side housing to which the oil pump is to be mounted.

19. A balancer device with an oil pump, the balancer device comprising:
- an upper-side housing to be mounted to a lower side of an internal combustion engine;
- a lower-side housing, which is provided below the upper-side housing when viewed in a direction of gravity and is fixed to the upper-side housing;
- a balancer main body accommodated in a space defined between the upper-side housing and the lower-side housing; and
- an oil pump fixed to the upper-side housing, the balancer device being provided inside an oil pan of the internal combustion engine,
- wherein a pump drive gear configured to drive the oil pump and a speed-reduction gear configured to drive the pump drive gear are arranged between the upper-side housing and the oil pump,
- wherein an end surface portion of the upper-side housing and an end surface portion of the oil pump are mounted in contact with each other so as to cover the pump drive gear and the speed-reduction gear on their upper side, and
- wherein an end surface portion of the lower-side housing and the end surface portion of the oil pump are mounted to each other so as to define a predetermined gap for discharging lubricating oil from a space in which the pump drive gear and the speed-reduction gear are arranged.

\* \* \* \* \*